United States Patent
Marchesini et al.

(10) Patent No.: US 9,528,619 B2
(45) Date of Patent: Dec. 27, 2016

(54) PRESSURE RELIEF VALVE FOR CONTAINERS SUITED FOR THE PNEUMATIC LOADING OF LOOSE SOLID PRODUCTS, IN PARTICULAR SILOS

(71) Applicant: WAMGROUP S.p.A., Modena (IT)

(72) Inventors: Vainer Marchesini, San Prospero (IT); Luca Golinelli, San Possidonio (IT)

(73) Assignee: WAMGROUP S.P.A., Modena (IT)

( * ) Notice: Subject to any disclaimer, the term of this patent is extended or adjusted under 35 U.S.C. 154(b) by 196 days.

(21) Appl. No.: 14/359,326

(22) PCT Filed: Nov. 23, 2012

(86) PCT No.: PCT/IB2012/056690
§ 371 (c)(1),
(2) Date: May 20, 2014

(87) PCT Pub. No.: WO2013/076704
PCT Pub. Date: May 30, 2013

(65) Prior Publication Data
US 2014/0326347 A1     Nov. 6, 2014

(30) Foreign Application Priority Data

Nov. 23, 2011  (IT) .............................. BO2011A0668

(51) Int. Cl.
*F16K 15/14*   (2006.01)
*F16K 17/02*   (2006.01)
(Continued)

(52) U.S. Cl.
CPC ............... *F16K 17/02* (2013.01); *B65G 53/12* (2013.01); *B65G 53/54* (2013.01); *B65G 53/60* (2013.01);
(Continued)

(58) Field of Classification Search
CPC ......... B65G 53/12; B65G 53/54; B65G 53/60; F16K 17/12; F16K 17/02; F16K 17/164; Y10T 137/788; Y10T 137/7771
See application file for complete search history.

(56) References Cited

U.S. PATENT DOCUMENTS

| | | | |
|---|---|---|---|
| 1,059,370 A | * | 4/1913 | Johnson .................... E03B 7/10 138/28 |
| 2,723,678 A | * | 11/1955 | Pearl ......................... F16K 7/02 137/493 |

(Continued)

FOREIGN PATENT DOCUMENTS

| CA | 2 428 936 | 2/2004 |
|---|---|---|
| DE | 69 26 613 | 10/1969 |

(Continued)

*Primary Examiner* — Jessica Cahill
(74) *Attorney, Agent, or Firm* — Leason Ellis LLP

(57) ABSTRACT

A pressure relief valve for containers suited for the pneumatic loading of loose solid products, in particular silos. The valve comprises a valve body having a first end, which pneumatically communicates with the inside of the container, and a second end, which is associated to a flow control organ, which is subject to the action of corresponding closing membrane. The flow control organ periodically establishes a fluid communication between said valve body and a duct that communicates with the outside. The valve is characterized in that at least one portion of the duct that communicates with the outside is suited to be elastically deformed by the pressure difference existing between the inside of said container and the inside of the duct itself.

18 Claims, 3 Drawing Sheets

(51) Int. Cl.
    *B65G 53/12*     (2006.01)
    *B65G 53/54*     (2006.01)
    *B65G 53/60*     (2006.01)
    *F16K 17/164*     (2006.01)
    *F16K 17/12*     (2006.01)

(52) U.S. Cl.
    CPC .............. *F16K 17/12* (2013.01); *F16K 17/164* (2013.01); *Y10T 137/788* (2015.04)

(56) References Cited

U.S. PATENT DOCUMENTS

| | | | |
|---|---|---|---|
| 3,953,077 A | | 4/1976 | Kulyabko et al. |
| 4,182,591 A | * | 1/1980 | Stanelle ............... B65G 69/182 |
| | | | 141/285 |
| 6,802,685 B1 | * | 10/2004 | Federhen ............... B65G 53/12 |
| | | | 222/442 |
| 2012/0319028 A1 | * | 12/2012 | Kusakabe ........... F16K 27/0254 |
| | | | 251/366 |

FOREIGN PATENT DOCUMENTS

| | | | | |
|---|---|---|---|---|
| DE | 24 21 725 | | 11/1975 | |
| DE | WO 0050324 A1 | * | 8/2000 | ............. B65G 53/12 |
| EP | 0 252 338 | | 1/1988 | |
| FR | 2 894 235 | | 6/2007 | |
| GB | 809 536 | | 2/1959 | |
| GB | 1 140 376 | | 1/1969 | |
| GB | 1 474 338 | | 5/1977 | |
| JP | WO 2011135883 A1 | * | 11/2011 | ......... F16K 27/0254 |
| WO | WO 2005/089879 | | 9/2005 | |

\* cited by examiner

PRESSURE RELIEF VALVE FOR CONTAINERS SUITED FOR THE PNEUMATIC LOADING OF LOOSE SOLID PRODUCTS, IN PARTICULAR SILOS

CROSS REFERENCE TO RELATED APPLICATIONS

The present application is a U.S. National Phase of International Patent Application PCT/IB2012/056690, filed Nov. 23, 2012, which claims priority to Italian Patent Application No. BO2011A000668, filed Nov. 23, 2011, each of which is incorporated herein by reference in its entirety.

TECHNICAL FIELD

The present invention is relative to a pressure relief valve for containers suited for the pneumatic loading of loose solid products.

In particular, the present invention finds advantageous, but not exclusive, application in silos, to which explicit reference will be made in the description below without because of this loosing in generality.

BACKGROUND ART

Pressure relief valves are well known in containers under pressure, such as for example silos, which are provided with a metal discharge duct, which can be connected to a further pipe for conveying powders to a confined and protected area.

Even tough these valves work in an excellent manner, they present the drawback that, in the long run, the powder that has been discharged can partly settle on the curve of the discharge and/or on the closing membrane of the discharge itself, thus requiring periodic cleaning and maintenance.

Possible solutions based on the use of rigid plastic materials instead of metal materials could probably lead to lower costs of the plant, but they would also cause significant wear problems as well as problems linked to the scaling of the discharge duct of the valve.

As of today, no solution to this problem has been found, except for the aforementioned solution, which requires anyway a periodic maintenance of the vale.

The solution according to the present invention provides an industrialized valve body made of plastic material, which comprises, though, a powder discharge duct made of a flexible material, for example an elastomer, in particular a polymer that is suited to be elastically deformed.

The powder discharge duct is constrained at its ends, so that the increase in pressure, due to the loading of the silo, causes it to be squashed and deformed, while, during the opening of the discharge, it resumes its original shape. This original shape squashing/resuming movement allows the powder discharge duct to vibrate, thus eliminating possible scaling.

During the discharge phase of the emission part of the dusty material is deposited on the exhaust pipe and stays there until the next rise of the internal pressure of the silo.

The pulsed action which acts on the exhaust pipe, before the opening of the valve according to the invention, allows the almost total removal of the material present and the detachment from the walls of those that might be encrusted. The activation of the deformation takes place already at pressures lower than those of the standard settings normally adopted by the normal pressure control valves (+500 mmH2O). The subsequent flow of material and air, with regard to the ratio of such a flow, will clean completely the duct thereby preventing the obstruction of the same. All this to guarantee the safety of operation and function of the valve itself, with a remarkable increase in the safety of people and the plant.

Even though there can be embodiments having straight and inclined pipes, one of the preferred embodiments of the present invention is based on the use of a curved discharge duct having a thickness ranging from 3 mm and 12 mm.

DISCLOSURE OF INVENTION

The pressure relief valve according to the present invention, besides being cheap and preventing polluting air from being discharged into the atmosphere, can work for a long time without needing maintenance and/or cleaning of its components as a consequence of wear.

According to the present invention, there is provided a pressure relief valve for containers suited for the pneumatic loading of loose solid products as claimed in Claim 1 or in any of the Claims depending directly or indirectly on Claim 1.

BRIEF DESCRIPTION OF THE DRAWINGS

For a better understanding of the present invention, a preferred non-limiting embodiment of the present invention will be described by way of example with reference to the accompanying drawings, in which.

BEST MODE FOR CARRYING OUT THE INVENTION

Figure 1:
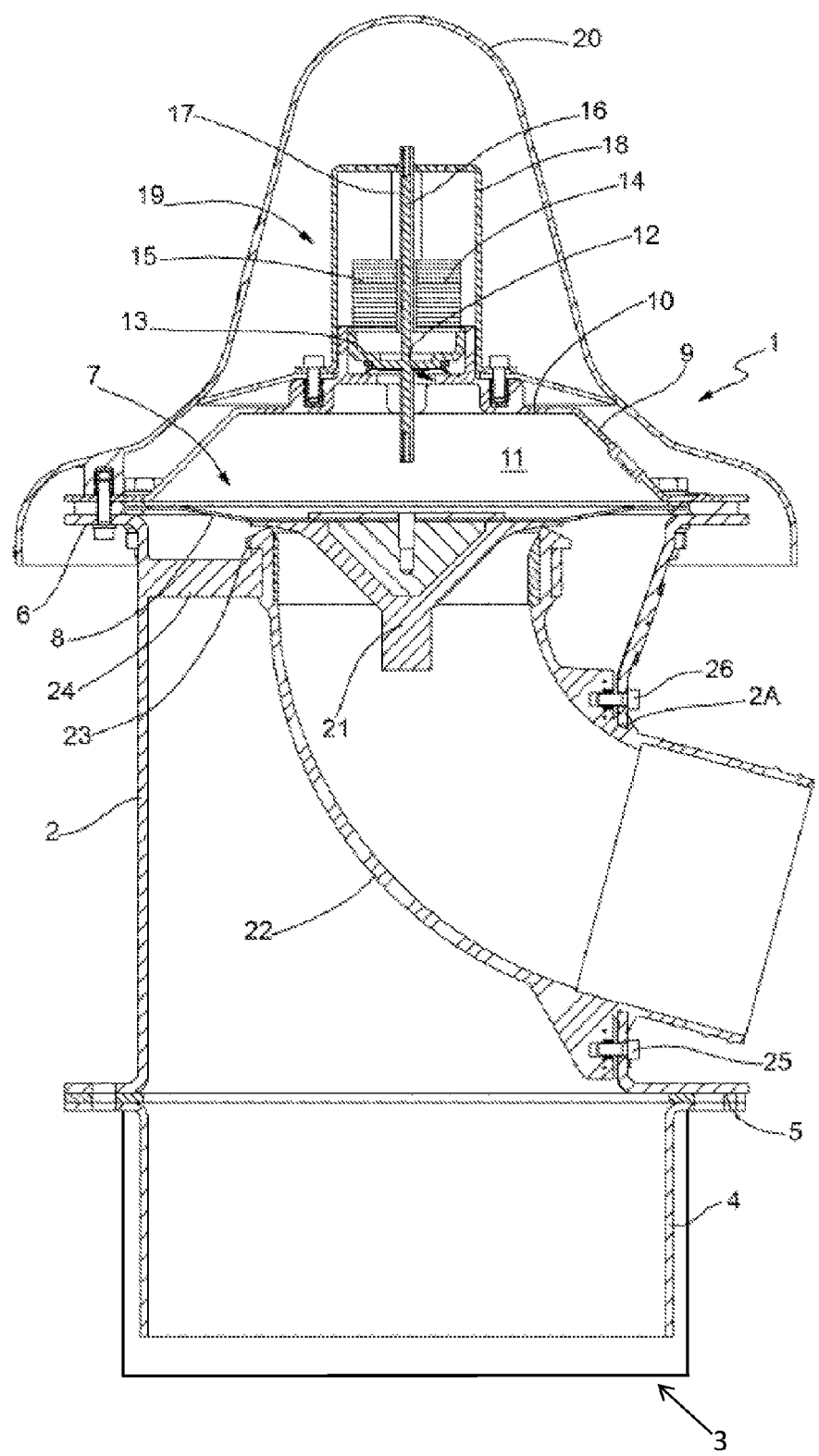
FIG. 1 shows a first configuration of the pressure relief valve according to the present invention.

A pressure relief valve 1 according to the present invention comprises a valve body 2, which pneumatically communicates with the inside of the container 3, for example a silo.

The valve body 2 of the valve 1 is connected to a sleeve 4, which is integral to the container 3, by means of a flange connection 5.

The upper end of the valve body 2 is provided with peripheral anchoring means 6 of the flow control organ 7, which preferably comprises, in turn, an elastic membrane 8, which is anchored along its external edge to the anchoring means 5.

The valve body 2 extends upwards, beyond the membrane 8, in a cap 9, which is provided, in its upper part, with a transverse end wall 10, which delimits, in the upper part, an intermediate chamber 11.

Therefore, the intermediate chamber 11 is delimited, in turn, by the cap 9 and by the membrane.

The transverse wall 10 is provided with an opening 12, on which a flow control body 13 rests, on which a calibration mass 14 lies, which comprises at least one calibration ring 15, which is run through by a support stem 16.

The weight of the calibration mass 12 is determined so as to keep the opening 12 closed, each time the pressure inside the auxiliary chamber 11 is lower than a predetermined value defined by the designer. Therefore, the weight of the calibration mass 14 can be changed by adding or removing calibration rings 15.

The vertical movement of the support stem 16 is guided by a vertical guide 17, which is supported by a bushing 18, which, in turn, is fitted to the transverse wall 10 by means of known means.

On the bushing 18 there are wide openings, which allow the intermediate chamber 11 to be discharged (see below).

The assembly consisting of the bushing 18, the flow control body 13, and the calibration mass 14 substantially builds a controlling device 19 for controlling the flow control organ 7, as described below.

In this way, when the pressure inside the auxiliary chamber 11 reaches such a value that causes the flow control body 13 to detach from the opening 12, after the detachment phase, the same pressure acts on a larger diameter section, thus causing the fast lifting of the calibration mass 14. This means that a dangerous blocking or stop of the Calibration mass 14 and of the flow control body 13 is avoided; what described above has turn out to be particularly advantageous in terms of safety and rapidity of the operation of the vale.

A protection cap 20, which is supported by the anchoring means 6, is arranged above the auxiliary chamber 11 and the controlling device 19.

In its central part, the membrane 8 of the flow control organ 7 is provided, in its lower part, with a flow control mass 21, which projects downwards inside a duct 22 communicating with the outside.

The duct 22 presents an edge 23, which is closed/opened by the vertical movement of the flow control mass 21.

The duct 22, which is inserted in a hole 2A obtained in the valve body 2, is fixed to the valve body 2 itself, on one side, by means of a flange 24, and, on the other side, by means of a pair of screws 25; 26 arranged close to the hole 2A itself.

The flow control mass 21 is advantageously conical and presents a top, which is directed downwards, so as to help the excess fluid flow outside of the container 3.

The elastic membrane 8 is provided with a series of through holes, which are distributed in a peripheral manner on an external annular surface of the elastic membrane 8 itself.

Said holes are suited to establish a fluid communication between the auxiliary chamber 11 and the container 3 through the valve body 2, so that, each time the pressure value in the container 3 changes, there is a certain delay in the change of the pressure value in the auxiliary chamber 11 itself. As a matter of fact, it is advisable for the change in the pressure value not to take place in an immediate manner.

The surface of the membrane 8 facing the inside of the container 3 is associated to a filtering element (not shown), which also covers the passage holes, so as to prevent powder from coming out of the holes themselves.

Figure 3:
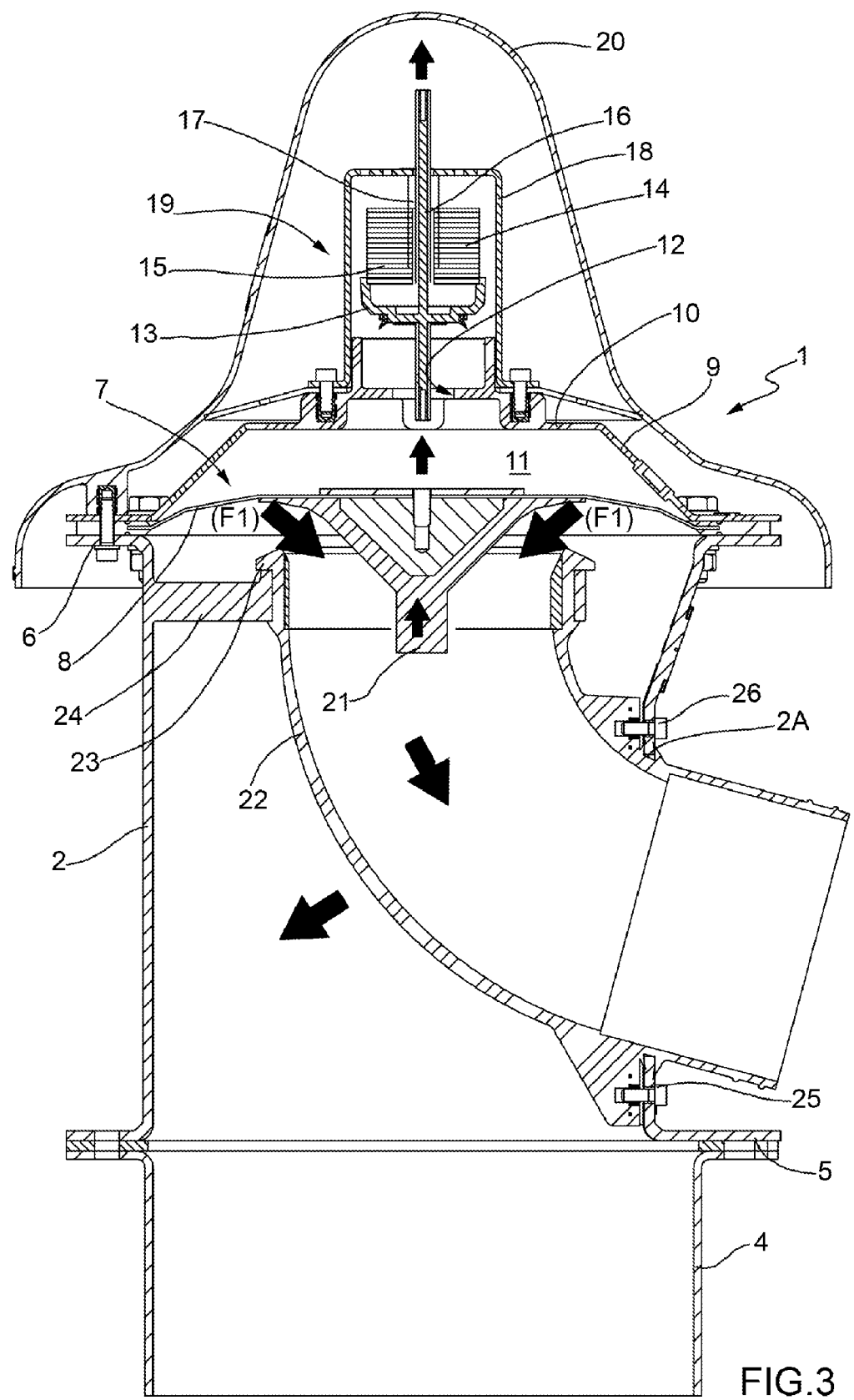
FIG. 3 shows a third configuration of the pressure relief valve according to the present invention.

The valve 1 works as follows:
when the pressure inside the container 3 slowly increases, the holes obtained in the peripheral portion of the membrane 8 allow the pressure in the auxiliary chamber 11 to simultaneously increase, thus exerting a progressive and increasing thrust on the flow control body 13, until it is rapidly lifted upwards, so that the excess gas can be discharged outside; this causes a sharp decrease of the pressure in the auxiliary chamber 11 and produces an unbalance on the membrane 8, which, due to the lower pressure that acts on its upper side, moves upwards, thus establishing a reciprocal communication, as indicated by the arrows (F1) of FIG. 3, between the valve body 2 and the duct 22, which leads to the discharge of the excess fluid quantity present in the container 3;

when the pressure inside the container 3 rapidly increases, the pressure inside the chamber 11, due to the reduced diameter of the holes obtained on the membrane 8, does not increase in a corresponding manner, but, instead, it practically remains at the initial value; this favours the initial lifting of the membrane 8 itself under the effect of the pressure of the fluid acting on the lower side, which is not subject to any opposite pressure with equal intensity on its upper side;

when the overpressure stops, the membrane 8 comes down again, until it rests on the edge 23 of the duct 22, under the effect of the elastic returning action and of the downward thrust, which is exerted on it by the flow control mass 21, thus allowing the calibration mass 14 to come down;

when, on the other hand, the pressure inside the container 3 drops beneath a calibration limit value, thanks to the holes obtained on the periphery of the membrane 8, the pressure drop in the container 3 is transmitted to the auxiliary chamber 11; in this case, under the effect of the pressure drop that has taken place, the force acting upwards on the lower side of the membrane 8 is higher than the downward force exerted by the flow control mass 21; therefore, the membrane 8 is lifted and lets an air quantity enter the container 3 in a direction that is opposite to the one indicated by the arrows (F1), said air quantity being sufficient to make the pressure in the container 3 raise again up to values close to the values of the external pressure.

Figure 2:
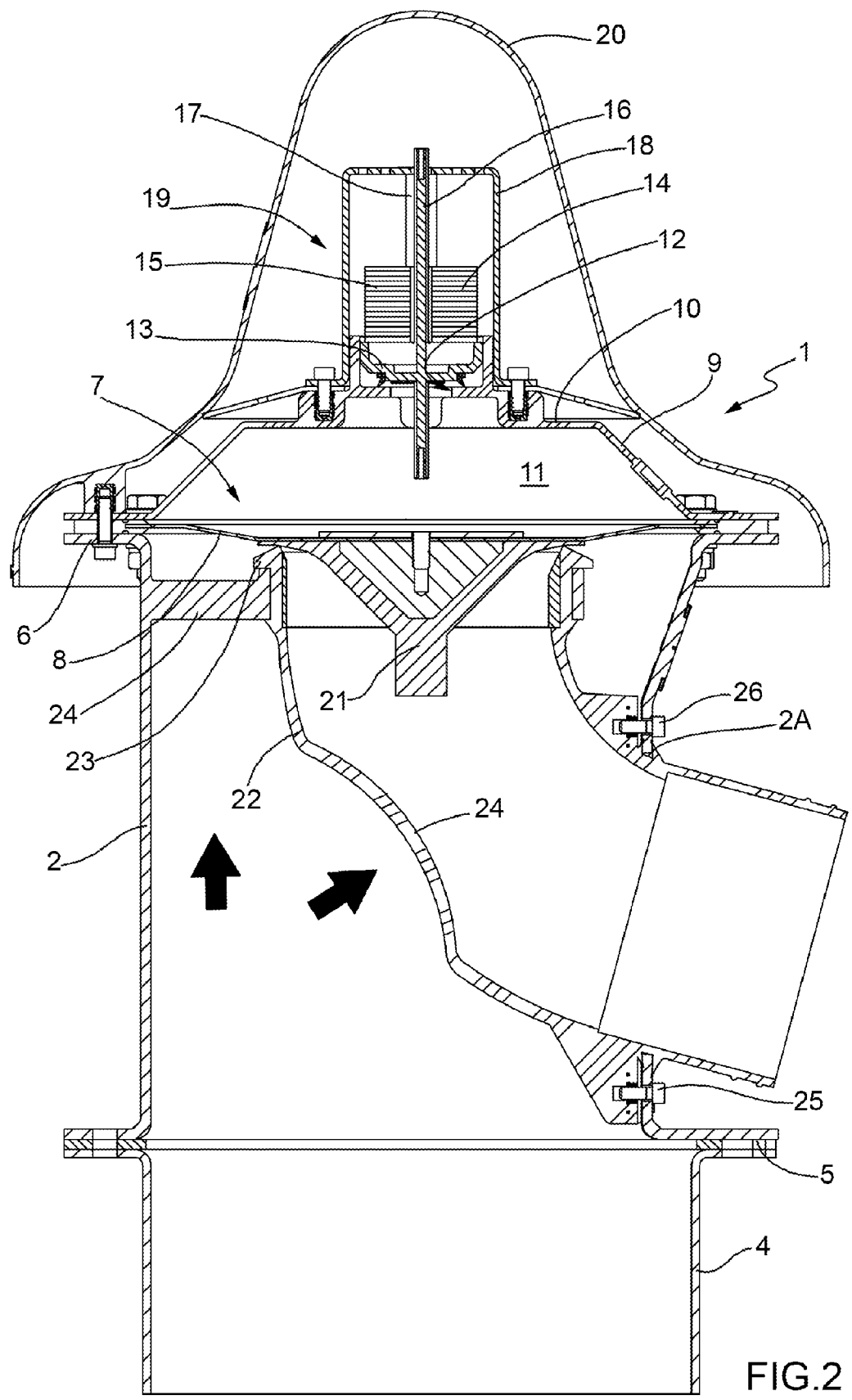
FIG. 2 shows a second configuration of the pressure relief valve according to the present invention.

As shown in FIG. 2, when the pressure inside the body valve 2 increases, because the pressure in the container 3 has proportionally increased, a force is generated, which squashes the duct 22, so as to form on the latter a recess 24, which projects towards the inside of the duct 22 itself. Said squashing force is due to the pressure difference existing between the outside and the inside of the duct 22. As already mentioned, the duct 22 is advantageously made of a flexible material, for example an elastomer, in particular a polymer that is suited to be elastically deformed.

In other words, during the pneumatic loading of the container 3, the duct is elastically deformed due to squashing (FIG. 2), while, during the opening of the discharge (FIG. 3), when the membrane 8 is lifted, the duct 22'resumes its original shape. This alternation of compressions/releases of the duct 22 allows said powder discharge duct 22 to vibrate, thus eliminating possible powder scales that may have settled on its internal wall. It should be pointed out that the vibrations are transmitted to the edge 23, as well; this significantly helps keep the edge 23 itself clean from powder and, therefore, guarantees a perfect closing of the mouth of the duct 22 by means of the flow control mass 21.

The discharge duct 22 is preferably curved and it preferably presents a thickness ranging from 3 mm to 12 mm.

It should be pointed out that the same squashing effect can also be observed, even though to a smaller extent, in a rectilinear duct (not shown), or in a duct consisting of different rectilinear sections, which originate a broken line, which substantially reproduces a curvilinear profile.

Furthermore, in order to allow the separation of the powder from the inner part of the duct 22, the thickness of said duct 22 can be different from area to area, so as to create areas that are thinner and more deformable with respect to thicker and less deformable areas. In this way preferential areas are advantageously created, in which deeper recesses are formed; said preferential areas alternate with other areas (having a larger thickness), in which less deep recesses are formed. This allows, to a certain extent, a graduation of the deformations and of the vibrations of the discharge duct, so a to obtain the best powder removing effect possible for the removal of powder from the internal wall of the discharge duct itself.

Practically, the same effect can be obtained, in a further embodiment that is not shown, by providing a discharge duct consisting of at least two elastomers having a different modulus of elasticity, so as to guide and control the deformation of the duct 22 and the relative vibrations induced on it.

Furthermore, the discharge duct can be made of a composite material having some sectors of elastomer and others of metal.

The duct can also be made of an elastomer with at least an insert of a different material inside said elastomer.

Another embodiment is represented by a discharge duct manufactured with a corrugated pipe made of metal/elastomer; or hard plastic/elastomer.

It should be pointed out that all the options described above (different thickness from area to area, at least two elastomers having a different modulus of elasticity, composite material with sectors of elastomer combined with other sectors of metal, elastomer with at least one insert, corrugated pipe) can be combined with each other, so that the designer can make the most sensible solution based on the application.

The pressure relief valve according to the present invention, besides being cheap and preventing polluting air from being discharged into the atmosphere, can work for a long time without needing maintenance and/or cleaning of its components as a consequence of wear.

The invention claimed is:

1. A pressure relief valve (1) for containers suited for the pneumatic loading of loose solid products, the valve comprising a valve body (2) having a first end, which pneumatically communicates with the inside of a container (3), and a second end, which is associated to a flow control organ (7), which is subject to the action of corresponding closing elastic means (8), said flow control organ (7) periodically establishing a fluid communication between said valve body (2) and a duct (22) that communicates with the outside;
    wherein the valve is characterized in that at least one portion of said duct (22) that communicates with the outside is suited to be elastically deformed by the pressure difference existing between the inside of said valve body (2) and the inside of the duct (22) itself, and at least one portion of said duct (22) is positioned within said valve body (2).

2. A valve (1), according to claim 1, characterised in that said at least one portion of said duct (22) is made of a flexible material that is suited to be elastically deformed.

3. A valve (1), according to claim 1, characterised in that elastic deformation of the duct (22) causes said at least one portion of said duct (22) to vibrate, thus eliminating powder scales.

4. A valve (1), according to claim 1, characterised in that said duct (22) is a curvilinear duct (22).

5. A valve (1), according to claim 1, characterised in that, in order to allow separation of powder from an inner part of the duct (22), the thickness of said duct (22) is different from area to area, so as to create areas that are thinner and more deformable with respect to thicker and less deformable areas.

6. A valve (1), according to claim 1, characterised in that said duct (22) comprises at least two elastomers having a different modulus of elasticity, so as to guide and control the deformation of the duct (22) itself and the relative vibrations induced on it.

7. A valve (1), according to claim 1, characterised in that said duct (22) is made of a composite material having some sectors of elastomer and others of metal.

8. A valve (1), according to claim 1, characterised in that said duct (22) is made of an elastomer and at least an insert of a different material inside said elastomer.

9. A valve (1), according to claim 1, characterised in that said duct (22) is manufactured with a corrugated pipe made of metal plus elastomer or plastic plus elastomer.

10. A pressure relief valve (1) for containers suited for the pneumatic loading of loose solid products, the valve comprising a valve body (2) having a first end, which pneumatically communicates with the inside of a container (3), and a second end, which is associated to a flow control organ (7), which is subject to the action of corresponding closing elastic means (8), said flow control organ (7) periodically establishing a fluid communication between said valve body (2) and a duct (22) that communicates with the outside;
    wherein the valve is characterized in that at least one portion of said duct (22) that communicates with the outside is configured to be elastically deformed by the pressure difference existing between the inside of said valve body (2) and the inside of the duct (22) itself to form a recess (24) located along a wall of the duct (22) and which projects towards an interior of the duct (22).

11. A valve (1) according to claim 10, characterised in that said at least one portion of said duct (22) is made of a flexible material that is suited to be elastically deformed.

12. A valve (1) according to claim 10, characterised in that the elastic deformation of the duct (22) causes said at least one portion of said duct (22) to vibrate, thus eliminating powder scales.

13. A valve (1), according to claim 10, characterised in that said duct (22) is a curvilinear duct (22).

14. A pressure relief valve (1) for containers suited for the pneumatic loading of loose solid products, the valve comprising:
    a valve body (2) having a first end and a second end, wherein the second end is associated with a flow control organ (7), which is subject to the action of corresponding closing elastic means (8), said flow control organ (7) periodically establishing a fluid communication between said valve body (2) and a duct (22) that communicates with the outside; and
    wherein the valve is characterized in that at least one portion of said duct (22) that communicates with the outside is configured to be elastically deformed by the pressure difference existing between the inside of said valve body (2) and the inside of the duct (22) itself to form a recess (24) located along a wall of the duct (22) and which projects toward an interior of the duct (22).

15. A valve (1), according to claim 14, further comprising:
    a flow control mass (21) positioned between the closing elastic means (8) and a top portion of the duct (22), wherein the flow control mass (21) moves vertically in an upward and downward fashion and projects downward inside at least a portion of the duct (22), and wherein the downward movement of the flow control mass (21) closes a space between the closing elastic means (8) and the edge (23) of the duct (22).

16. A valve (1), according to claim 15, characterised in that said at least one portion of said duct (22) is made of a flexible material that is suited to be elastically deformed.

17. A valve (1), according to claim 15, characterised in that the elastic deformation of the duct (22) causes said at least one portion of said duct (22) to vibrate, thus eliminating powder scales.

18. A valve (1), according to claim 15, characterised in that said duct (22) is a curvilinear duct (22).

* * * * *